United States Patent Office 2,927,863
Patented Mar. 8, 1960

2,927,863

COATING COMPOSITIONS AND METHODS
OF PREPARING SAME

Ralph Marotta, Malden, and Carl R. Martinson, Wakefield, Mass., assignors to Monsanto Chemical Company, St. Louis, Mo., a corporation of Delaware No Drawing. Application August 15, 1955
Serial No. 528,532

18 Claims. (Cl. 106—228)

The present invention relates to improved flatted and semi-gloss coating compositions, particularly drying oil varnishes, and also to methods of preparing such compositions.

It has been proposed heretofore to use silica aerogels or silica gels in various coating compositions for the purpose of providing a composition which when applied to substrates produces a clear and transparent flatted coating or a coating having a considerably reduced gloss or shine. Such compositions and coatings are generally referred to as flatted or semi-gloss compositions and coatings. When silica aerogels and gels are introduced into various coating compositions, and particularly drying oil-resin varnishes, however, they are subject to hard settling, that is, they tend to settle out of such compositions or varnishes to form a hard, gummy cake which is extremely difficult to disperse by ordinary stirring.

In our copending application, Serial No. 187,818, filed September 30, 1950, now issued as U.S. Patent No. 2,717,214, we have described and claimed the use of certain surface-active condensates of alkylene oxides and mercaptans, tall oil, rosin oil, rosin acid or alkyl amides to prevent or minimize the hard settling of silica flatting agents in drying oil-resin varnishes. We have tested a large variety of other surface-active alkylene oxide condensates prepared from ethylene oxide and mono-alkyl phenols or dialkyl phenols, secondary alcohols and 5 mols of ethylene oxide, 18 carbon atom alcohols and ethylene oxide and primary alcohols and propylene oxide and ethylene oxide and have found that none of these are suitable for the purpose described in said copending application.

In accordance with the methods described in the present application, it is possible to produce flatted coating compositions and particularly drying oil-resin varnishes containing silica aerogels or gels which are relatively free of the tendency to settle to form hard gummy cakes by the use of certain surface active agents not described above. Although the flatting agents in the compositions described herein may settle, they flocculate to form a voluminous relatively soft deposit which can be dispersed throughout the coating vehicle by simple stirring.

It is, accordingly, one object of this invention to provide an improved method for the prevention of hard settling of flatted coating compositions and particularly drying oil-resin varnishes by the use of certain surface active agents.

It is a further object of this invention to provide an improved method of flatting coating compositions and particularly drying oil-resin varnishes with silica aerogels and to eliminate the formation of hard, gummy cakes of such aerogels in the coating vehicle by the use of certain surface active agents.

It is a further object of this invention to provide flatted coating compositions and particularly drying oil-resin varnishes which are substantially free of the tendency to form hard, gummy cakes of the flatting agent by incorporating therein certain surface active agents.

It is a further object of this invention to provide flatted coating compositions and particularly drying oil-resin varnishes containing silica aerogels as the flatting agent and which are substantially free of the tendency of forming hard, gummy cakes of the aerogel by incorporating therein certain surface active agents.

Still further objects and advantages of this invention will appear in the following description and the appended claims.

The compositions of this invention comprise, in general, a film-forming material in an organic solvent or other dispersing liquid, for example, a coating composition such as a lacquer or a drying oil-resin varnish, in which is incorporated a finely divided flatting agent comprising essentially silica such as finely divided silica aerogel in an amount sufficient to at least reduce the gloss of coatings prepared from such lacquer or varnish and a non-ionic surface active condensate of 7 to 20 mols of ethylene oxide and 1 mol of an aliphatic alcohol containing from 8 to 16 carbon atoms in an amount sufficient to substantially prevent hard caking of such flatting agent. Such non-ionic surface active condensate should be at least slightly soluble in the coating vehicle. The compositions may also comprise other ingredients such as siccatives or driers, compatible thinners, natural or synthetic resins and small amounts say up to 15% by weight of insoluble organic or inorganic pigments or soluble dyes.

A large variety of coating compositions are useful in preparing the compositions of this invention including the drying oil-resin varnishes such as the unsaturated fatty oil-resin varnishes, for example, linseed oil and tung oil varnishes; natural resin-unsaturated fatty oil varnishes such as congo or rosin-linseed oil or tung oil varnishes, synthetic resin-unsaturated fatty oil varnishes such as maleic, ester gum, modified phenolic or modified rosin-pentaerythritol resin in combination with unsaturated fatty oils such as linseed oil or tung oil, and fatty acid or drying oil modified phthalic anhydride-glyceride resins and the like.

Other coating compositions which are useful in preparing the compositions of this invention include the lacquer type of coating materials such as the cellulose acetate-acetone lacquers, maleic-rosin lacquers, nitro-cellulose lacquers, polyvinyl chloride and vinyl chloride-vinyl acetate copolymer lacquers and polymethyl methacrylate lacquers. Natural resin lacquers such as copal and shellac lacquers may also be used. Since the problem of hard settling of silica aerogels and gels is particularly troublesome in the case of drying oil-resin varnishes or drying oil-resin lacquers, the present invention is particularly directed to overcoming this problem and accordingly the preferred coating compositions for use in preparing the compositions of this invention are the drying oil-resin type of composition and particularly the drying oil-resin varnishes.

The silica flatting agents used in the compositions of this invention comprise essentially silica materials which are prepared by chemical reaction and are hydrophilic although insoluble in water. Included in this class of materials are the silica gels which are prepared by reacting an alkali silicate and an acid, silica aerogels which are prepared by removing the liquid phase from a silica hydrogel or silica organogel, or a silica organogel which is prepared, for example, by replacing the water in a silica hydrogel with an organic liquid.

Of the various possible flatting agents which may be used, the silica aerogels are preferred because of their high flatting efficiency, lack of migration, the clarity and transparency of the coatings containing the same and the fact that the silica aerogels do not appreciably impair film strength and, in most instances, actually improve the hardness and mar resistance of the varnish film. While such aerogels have been used heretofore in coating compositions generally, and to some extent in drying oil-resin varnishes specifically, they, more than any other type of known flatting agent, have been most susceptible to hard settling in drying oil-resin varnish vehicles. Accordingly, because of their excellent flatting properties and the fact that they can be used in drying oil-resin varnishes in combination with the non-ionic surface active condensates, described hereinafter, without hard settling, they are particularly useful as flatting agents in the drying oil-resin varnishes described herein.

The term "silica aerogel" as used herein is intended to include the materials prepared by removing a liquid from a silica gel structure without appreciable shrinkage of the gel and replacing such liquid with a gas, as, for example, air. These aerogels are suitably prepared, for example, by first reacting aqueous sodium silicate such as sodium silicate with an acid such as sulfuric acid to form a silica hydrogel. This gel is then washed with water to remove water-soluble reactants and salts. Such gel contains water as a liquid phase, and this water is preferably at least partially or completely removed from the gel before the gel is converted to an aerogel, and is replaced by a water-miscible liquid having a lower critical temperature. This is accomplished, for example, by washing the silica hydrogel with ethanol, isopropanol, acetone and the like until a substantial quantity of the water in the hydrogel has been displaced by the water-miscible liquid. The gel is then slowly heated in an autoclave or other pressure resistant vessel, small quantities of vapor being released as required to avoid excessive pressures, until the temperature of the gel is slightly above the critical temperature of the liquid in the gel. At this point the liquid has been converted to the vapor state and is slowly released as a vapor so as to avoid destruction of the gel structure. The aerogel obtained in this manner has substantially the same volume as the initial silica hydrogel and consists essentially of a cellular silica structure having a large amount of void space. A more detailed description of the above procedure for preparing aerogels will be found in the patents to Samuel S. Kistler, Nos. 2,093,454, 2,188,007 and 2,249,767.

Silica aerogels may also be prepared by heating silica organo-aquesols in an autoclave above the critical temperature of the liquid phase in essentially the same manner as described above. A detailed description of the procedure for preparing such silica organo-aquasols will be found in the Morris D. Marshall patent, No. 2,285,449.

Silica-organic liquid gels may be used instead of the silica aerogels or to replace a portion of the silica aerogels with equally good results. Such gels include those substances which are prepared by first reacting, for example, an aqueous sodium silicate and an acid, washing the resulting gel free of electrolytes and then replacing the water in the gel with an organic liquid which is miscible with the liquid constituents in the coating composition. This may be accomplished, for example, by replacing the water in the gel with an organic liquid which is miscible with water and also with the liquid constituents in the coating composition or by replacing the water in the gel with a water-miscible organic liquid and then replacing such organic liquid with another organic liquid miscible therewith and with the liquids in the coating composition. A more detailed description of the preparation of silica gels of this type will be found in the patents to Samuel S. Kistler, No. 2,188,007 and Charles G. Harford, No. 2,180,145. It is to be understood, however, that these gels are to be distinguished from ordinary silica gels, that is, gels which have been prepared, for example, by reacting an aqueous sodium silicate with an acid, washing the gel to remove salts and then drying the gel to remove the liquid phase. This latter type of silica gel, that is, an ordinary silica gel, may be used for flatting varnishes, but is not as suitable, particularly from the standpoint of film clarity and film strength, as the silica-organic liquid gels referred to above.

The flatting agents employed in the compositions of this invention are to be distinguished from organic or inorganic pigments or soluble dyes. The organic or inorganic pigments have the property of coloring the varnish film and the term "color" is intended to include white and black, whereas the flatting agents employed herein are not coloring materials, that is, they do not appreciably change the original color of the varnish film. Moreover, small quantities of the pigments tend to opacify the film, that is, they render the film less clear and less transparent whereas the flatting agents employed herein do not appreciably change the clarity or transparency of the film when used in small amounts, say up to 10% on the weight of the varnish solids. The silica flatting agents are also distinguished from most pigments in that they have a considerably larger surface area than pigments and consist of average particles which are considerably larger than most pigment particles. The flatting agents as used herein are distinguished from soluble dyes in that they are not coloring materials and are not soluble in the coating vehicle.

The flatting agents are present in the coating composition of this invention in the form of relatively fine particles having an average particle size between about 1 and 15 microns. In the case of silica aerogels and silica-organic liquid gels best results are obtained when the average particle size of the aerogel or gel particle is between about 2 and 8 microns.

In general, the non-ionic surface-active condensates employed in the processes and compositions of this invention are the condensation products of 7 to 20 molecular proportions of ethylene oxide and 1 molecular proportion of an aliphatic monohydric alcohol having from 8 to 16 carbon atoms. However, such condensation products should be soluble in the coating composition in the amount of at least 0.05% by weight. Such condensation products may be represented by the general formula:

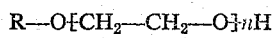

$$R\text{---}O\text{\{}CH_2\text{---}CH_2\text{---}O\text{\}}_nH$$

where R is an alkyl radical containing from 8 to 16 carbon atoms and $n$ is a positive number from 7 to 20. Unsatisfactory results have been obtained if the condensation product contains less than 7 mols of ethylene oxide or if the alcohol contains less than 8 or more than 16 carbon atoms. Best results have been obtained with the condensation products of 7 to 20 molecular proportions of ethylene oxide and 1 molecular proportion of a branched chain primary alkyl monohydric alcohol containing from 10 to 15 carbon atoms in the alkyl group. The preferred compounds within this class of condensation products are the condensation products of 10 to 20 mols of ethylene oxide with 1 mol of tridecanol which is a mixture of isomeric branched chain primary monohydric tridecyl alcohols. The tridecanol boils within the range of 252 to 272° C. (ASTM distillation) at atmospheric pressure, and is a fraction produced by the Oxo process from olefines of the class consisting of polybutylenes and polypropylenes such as triisobutylene, tetrapropylene, tetraisobutylene, pentapropylene, pentaisobutylene and hexapropylene. Satisfactory results have been obtained with the condensation products of 1 molecular proportion of a secondary alkyl monohydric alcohol having from 8 to 16 carbon atoms and 7 to 20 molecular proportions of ethylene oxide. A preferred condensation product of this class is the condensation product of 1 molecular proportion of octanol-2 and 15 molecular proportions of ethylene oxide.

The utility of the condensation products described herein for the purpose of this invention varies somewhat with the length of the carbon chain and the number of mols of ethylene oxide combined therewith. For example, the best condensation products prepared from alkyl monohydric alcohols having 8 and 9 carbon atoms in the alkyl group are those which contain from about 10 to 20 ethenoxy groups or 10–20 mols of combined ethylene oxide, whereas in the case of condensation products prepared from alkyl monohydric alcohols having from 10 to 16 carbon atoms the entire range of 7 to 20 mols of ethylene oxide may be used.

The non-ionic surface active condensates employed in this invention are generally prepared by methods known in the art, for example, by reacting the ethylene oxide and the alkyl monohydric alcohol at elevated temperatures, that is, temperatures above 90° C., and preferably between 100 and 200° C., in the presence of a small amount, for example, from about 0.1 to 3% on the weight of such alcohol, of an alkaline catalyst, sodium or potassium hydroxide or carbonate, ammonia, or sodium or potassium ethylate.

The non-ionic surface active condensates employed in this invention serve the function of flocculating the flatting agent particles thereby substantially preventing hard settling, that is, the formation of hard, gummy cakes of flatting agent particles. This flocculating effect of the non-ionic surface active condensates in a coating composition vehicle and particularly a drying oil-resin varnish vehicle is especially noticeable in the case of silica aerogel particles which normally form a hard, gummy cake in the absence of such non-ionic agents.

The exact mechanism by which the non-ionic surface active condensates prevent hard settling of the silica flatting agents is not understood, but it is believed that the non-ionic condensate coats the particles of the silica flatting agent, and particularly the silica aerogels, preferentially and deactivates the surface of the particle thereby markedly reducing the attraction between the particles of flatting agent and the resinous substances in the coating composition and also between the particles of flatting agent. In any event, hard settling is substantially prevented and the particles of flatting agent are in a flocculated condition. Thus, although the particles of flatting agent may, and oftentimes do, settle to some extent they form a voluminous, soft layer in the coating composition and this deposit is readily dispersed by simple agitation.

The compositions of this invention are prepared, in general, by dispersing the silica flatting agent in the coating composition in the presence of the non-ionic surface active condensate. This may be accomplished in a variety of ways depending to some extent on the particular coating composition used. For example, when the silica flatting agent is to be incorporated in a vinyl lacquer such as a vinyl chloride-vinyl acetate copolymer lacquer which is to be used for coating fabrics it is possible to disperse the flatting agent by stirring it into the lacquer in the presence of the non-ionic surface active condensate. With wood lacquers and drying oil-resin varnishes where the smoothness of the coating is of importance, it is preferred to grind the silica flatting agent and the lacquer or drying oil-resin varnish in the presence of the non-ionic condensate until the dispersion is smooth and the flatting agent is in a flocculated condition when the composition is allowed to stand. When smoothness of the coating is of primary interest, it is preferable to grind the mixture in a pebble mill until the flatting agent has the desired particle size.

In the case of lacquers and drying oil-resin varnishes it is preferred to grind the coating composition and the flatting agent in the presence of the non-ionic condensate and then add at least one and preferably 2 or more increments of the lacquer or varnish, as the case may be, to build up the solids content of the original grind. This enables the preparation of fairly concentrated coating compositions. In the case of lacquers, that is a solution of a film-forming material in a solvent and which does not require oxidation to produce a useful film, it is not necessary to grind the mixture after the increments of lacquer have been added to the original grind. However, in the case of drying oil-resin varnishes best results have been obtained by grinding the composition after each addition of varnish to the original grind and, accordingly, this procedure is preferred with drying oil-resin varnishes.

The grinding, when such a technique is employed, may be carried out in a pebble mill, steel ball mill, two roller mill or the like. Other forms of grinding apparatus may be used as will be apparent to those skilled in the art. Best results have been obtained by grinding the ingredients in a ball mill and accordingly such means are preferred in preparing the compositions of this invention.

The proportion of ingredients used may be varied considerably depending upon the type of finish desired, that is, whether it is to be a flat or semi-gloss finish, and the particular coating composition and silica flatting agent employed in the composition. The coating composition may be used as it is prepared and may comprise, for example, from about 20 to 60% by weight solids in such instances. On the other hand, the coating composition may be thinned down with a miscible, relatively non-viscous thinner such as a medium boiling aromatic liquid either prior to, during or after the addition of the flatting agent and non-ionic surface active condensate. In most instances, it is preferred to thin the coating composition to a solids content of about 15 to 35% by weight during the initial grinding operation and at the time the flatting agent and non-ionic surface active condensate are added to the coating composition and then add increments of the coating composition to the resulting grind to build up the solids content of the composition to about 20 to 50% by weight. For best results, it is preferred to grind the initial mixture and the mixture obtained by the addition of coating composition vehicle until the grind is smooth.

The amount of silica flatting agent added depends primarily upon the type of finish desired and the efficiency of the flatting agent. When silica aerogels or silica-organic liquid gels of the type previously described herein are used, it is possible to use smaller amounts than would normally be used in the case of other flatting agents to obtain the same reduction in gloss. In general, the flatting agent is used in amounts sufficient to decrease the gloss of the coating, but insufficient to materially reduce the clarity, transparency and strength of the coating film. Satisfactory semi-gloss results are obtained especially in the case of silica aerogels or the silica-organic liquid gels by using from 1 to 5% of flatting agent solids based on the coating composition solids in the final composition. In some cases even less than 1% of silica aerogel solids may be used if only a slightly dulled film is desired. Completely flatted coatings may be obtained by using up to 30% on the coating composition solids of a silica aerogel or a silica-organic liquid gel without detracting appreciably from the clarity, transparency or strength of the coating film. However, with other silica flatting agents smaller amounts must be used when no appreciable loss in coating film strength can be tolerated. When silica aerogels or silica-organic liquid gels are used it is preferred to employ from 5 to 15% of such materials on the coating composition solids in the final coating mixture for most purposes.

The amount of non-ionic surface active condensate used is dependent primarily on the concentration of flatting agent used and is also dependent on the particular flatting agent used. Thus, it is possible to use smaller amounts of the non-ionic condensate when relatively small amounts of the flatting agent are employed. Moreover, it is possible to use smaller amounts of the non-ionic condensate when the flatting agent is an ordinary silica gel than in the case of silica aerogels. Satisfactory results are obtained, in general, by using from about 1 to 30% of the non-ionic condensate based on the weight of the flatting agent. However, it is to be understood that even smaller amounts of the non-ionic condensate may be used in some instances while larger amounts may be used if the non-ionic condensate is highly soluble and the properties of the varnish film are not materially altered. In most cases the use of from 4 to 20% of the non-ionic condensate on the weight of the flatting agent produces the best results and such amounts are accordingly preferred.

In carrying out the preparation of the flatted or semi-gloss coating compositions the time of grinding may be varied considerably depending upon the grinding medium or vehicle and the type of grinding means and procedure used. In general, the total grinding time varies between about 1 and 16 hours in a pebble or ball mill, of which the initial grinding period is from about 0.5 to 10 hours and the subsequent grinding periods are from about 0.5 to 6 hours. It will be understood, of course, that for certain types of finishes the coating composition-flatting agent mixture may be ground, that is, ground for relatively short periods of time and, on the other hand, the mixture may be over-ground, that is, ground for long periods of time especially when smoothness is desired. In the latter case the improved smoothness of the coating is obtained with some loss in flatting efficiency. For silica aerogels a total grinding period of from 6 to 16 hours in a pebble mill is usually sufficient and generally gives the best results. In carrying out the grinding of silica aerogels and silica-organic liquid gels in a varnish vehicle it is preferred to initially grind the flatting agent in the thinned varnish vehicle for a period of 1 to 10 hours in a pebble mill and then grind the mixture for periods of 15 minutes to 90 minutes after the addition of more varnish to the mixture. The subsequent grinding operations are preferably carried out so that the total subsequent grinding time is more than 30 minutes and less than 200 minutes.

A further understanding of the compositions and methods of this invention will be obtained from the following specific examples which are intended to illustrate this invention but not to limit the scope of the invention, parts and percentages being by weight unless otherwise specified.

*Example I*

A linseed oil modified glycerine-phthalic anhydride alkyd resin varnish of medium oil length and containing 38% solids and having an acid value of 25 was used as the drying oil varnish.

Fifty-nine parts of the above varnish thinned with 205 parts of medium boiling naphthenic hydrocarbon solvent together with 30 parts of finely divided silica aerogel having a dry bulk density of 6 pounds per cubic foot, and 6 parts of the soluble condensation product of 1 mol of a mixture of isomeric branched chain primary monohydric tridecyl alcohols boiling in the range of 252 to 272° C. (ASTM distillation) at atmospheric pressure and 10 mols of ethylene oxide were ground in a one-quart pebble mill at 60 r.p.m. for a period of about 14 hours to form a mill base. One hundred parts of the varnish were added to the mixture in the pebble mill and the resulting mixture was ground for one hour at 60 r.p.m. Two hundred and forty-one parts of the varnish were added to the pebble mill and the resulting mixture was ground for a period of one hour at 60 r.p.m. to provide a flat varnish.

The silica aerogel in the varnish remained in a flocculent condition giving a varnish which retained its excellent appearance and properties over an extended period of time. The aerogel in the varnish did not settle to form a hard cake, but, on the contrary, formed a voluminous soft layer which was readily dispersed by simple stirring.

A flatted varnish prepared in the same manner but without the use of the ethylene oxide condensation product, described in the second paragraph of this Example I, settled rapidly to form a low volume deposit which deteriorated into a hard, gummy mass within a period of 2 weeks.

*Example II*

A phenolic type varnish was first prepared as follows:
One hundred pounds of a pure phenolic resin, prepared by heating para tertiary amyl phenol with formaldehyde under alkaline conditions, and 12.5 gallons of alkali refined linseed oil were heated to a temperature of 565° F. within a period of 40 minutes and then held at that temperature for a period of 90 minutes. Twelve and five tenths gallons of tung oil were then added and the batch was heated to a temperature of 525° F. and held at that temperature until it had a viscosity of E. The batch was then cooled and thinned with mineral spirits until it contained 50% solids. Sufficient amounts of cobalt and lead naphthenate were then added to the thinned batch to provide 0.03% cobalt and 0.3% lead, respectively, as metal based on the oil in the batch.

Two hundred and fifty-eight parts of the above described varnish thinned with 50 parts of a medium boiling naphthenic hydrocarbon solvent, 13 parts of silica aerogel and 2.0 parts of the condensation product of 1 mol of a mixture of isomeric branched chain primary monohydric tridecyl alcohols boiling in the range of 252 to 272° C. (ASTM distillation) at atmospheric pressure and 15 mols of ethylene oxide were ground to smoothness in a one-quart pebble mill, which required about 11 hours. A flat varnish was thus obtained in which the silica aerogel was finely flocculated. After aging for 6 months the silica aerogel particles in the varnish were easily redispersed by simple stirring and did not form a hard, gummy cake as in the case of a similar varnish prepared without the ethylene oxide condensation product described in the first sentence of this paragraph.

*Example III*

A varnish was prepared by first heating 20 gallons of an alkali refined linseed oil and 100 pounds of a phenol modified copal resin having a melting point of 167 to 172° C. and an acid value of 20 to 25 to a temperature of 585° F., after which the mixture was held at 585° F. for a period of 40 minutes to body the mixture. Five gallons of bodied linseed oil were then added and the resulting mixture was thinned with mineral spirits until it contained 50% non-volatile matter. Sufficient amounts of cobalt and lead naphthenate were then added to provided 0.03% cobalt and 0.3% lead, respectively, as metal based on the oil in the varnish.

A silica aerogel flatted vanish was produced from the above varnish using the procedure described in the second paragraph of Example II. The silica aerogel in the flatted varnish remained in a flocculent condition and did not hard settle. Varnish films formed from the flatted varnish had excellent clarity and transparency and were substantially flat in appearance.

*Example IV*

A linseed oil-ester gum varnish having an oil length of 12.5 and an acid value of 5 and containing 55% solids was used as the drying oil varnish.

Two hundred and twenty-five parts of the above varnish, 56 parts of turpentine, 17 parts of silica aerogel having a dry bulk density of 6 pounds per cubic foot and 2 parts of the condensation product of 1 mol of octanol-2 and 15 mols of ethylene oxide were ground in a pebble mill for a period of 8 hours. Eighty-four parts of the clear varnish were added to the mixture in the pebble mill and the liquid mass was ground in the pebble mill for three hours. The resulting varnish contained the aerogel in flocculated form and provided dry varnish films having a gloss of 50 as measured by a Gardner 60° Glossmeter. After aging for long periods of time, that is, at least 12 months, the varnish appeared to be stable and had substantially the same appearance as the freshly flatted varnish. Varnish films cast from the aged varnish were substantially as smooth, flat and free of agglomerates as the films cast from the freshly prepared varnish.

A flatted varnish prepared in the same manner but without the use of the octanol-2-ethylene oxide condensation product had settled within two weeks to form a hard, gummy, non-redispersible cake.

A variety of ethylene oxide condensates, including those described below, were found to be unsatisfactory for the purposes of this invention.

Condensate of 1 mol of octanol-2 and 5 mols of ethylene oxide.

Condensate of 1 mol of stearyl alcohol and 7.5 mols of ethylene oxide.

Condensate of 1 mol of nonyl phenol and 7.7 mols of ethylene oxide.

Condensate of 1 mol of nonyl phenol and 15 mols of ethylene oxide.

Condensate of 1 mol of dinonyl phenol and 10 mols of ethylene oxide.

Condensate of 1 mol of a mixture of isomeric branched chain primary monohydric tridecyl alcohols boiling in the range of 252 to 272° C. (ASTM distillation) at atmospheric pressure and 5 mols of ethylene oxide.

Condensate of dodecyl phenol and 10 mols of ethylene oxide.

What is claimed is:

1. A composition of matter comprising a coating composition consisting essentialy of a film-forming solid dissolved in an organic solvent therefor and having incorporated therein a silica gel flatting agent in an amount sufficient to reduce the gloss of films prepared from said composition and a surface active condensation product of 7 to 20 molecular proportions of ethylene oxide and 1 molecular proportion of an aliphatic monohydric alcohol having from 8 to 16 carbon atoms and selected from the group consisting of alkyl primary monohydric alcohols and alkyl secondary monohydric alcohols, said condensation product being soluble in said solvent to the extent of at least 0.05% by weight and being present in an amount sufficient to substantially prevent hard settling of said flatting agent.

2. A composition of matter comprising a drying oil-resin varnish consisting essentially of a drying oil-resin dissolved in an organic solvent and containing from about 20 to 60% by weight of solids in which is incorporated a silica gel flatting agent in an amount sufficient to reduce the gloss of films prepared from said varnish and from 1 to 30%, on the weight of said flatting agent, of a surface active condensation product of 7 to 20 molecular proportions of ethylene oxide and 1 molecular proportion of an aliphatic monohydric alcohol having from 8 to 16 carbon atoms and selected from the group consisting of alkyl primary monohydric alcohols and alkyl secondary monohydric alcohols, said condensation product being soluble in said varnish to the extent of at least 0.05% by weight.

3. A composition as in claim 2, but further characterized in that said flatting agent is a silica aerogel.

4. A composition of matter comprising a drying oil-resin varnish consisting essentially of a drying oil-resin dissolved in an organic solvent and containing from about 20 to 60% by weight of solids, from 1 to 30%, on the weight of solids in said varnish, of a silica aerogel and from 1 to 30%, on the weight of said aerogel, of a nonionic surface active condensation product of from 7 to 20 molecular proportions of ethylene oxide and 1 molecular proportion of an aliphatic monohydric alcohol having from 8 to 16 carbon atoms and selected from the group consisting of alkyl primary monohydric alcohols and alkyl secondary monohydric alcohols, said condensation product being soluble in said varnish to the extent of at least 0.05% by weight, said aerogel being present in said varnish in the form of a voluminous, soft layer.

5. A composition of matter as in claim 4, but further characterized in that said condensation product is the condensation product of 7 to 20 molecular proportions of ethylene oxide and 1 molecular proportion of an alkyl primary branched chain monohydric alcohol having from 8 to 16 carbon atoms in the alkyl group.

6. A composition of matter as in claim 5, but further characterized in that the condensation product is a condensation product of 10 to 20 molecular proportions of ethylene oxide and 1 molecular proportion of a mixture of isomeric branched chain primary monohydric tridecyl alcohols boiling in the range of 252 to 272° C. at atmospheric pressure.

7. A composition of matter as in claim 4, but further characterized in that said condensation product is the condensation product of 7 to 20 molecular proportions of ethylene oxide and 1 molecular proportion of a branched chain alkyl primary monohydric alcohol having from 10 to 16 carbon atoms.

8. A composition of matter as in claim 4, but further characterized in that said condensation product is the condensation product of 1 molecular proportion of an alkyl secondary monohydric alcohol having from 8 to 16 carbon atoms and 7 to 20 molecular proportions of ethylene oxide.

9. A composition of matter as in claim 8, but further characterized in that said condensation product is a condensation product of 1 mol of octanol-2 and 15 mols of ethylene oxide.

10. A process of preparing flatted and semi-gloss compositions which comprises grinding a mixture of a coating composition consisting essentially of a film-forming solid dissolved in an organic solvent therefor and a silica gel flatting agent in the presence of from 1 to 30%, on the weight of said flatting agent, of a nonionic surface active condensation product of 7 to 20 molecular proportions of ethylene oxide and 1 molecular proportion of an aliphatic monohydric alcohol having from 8 to 16 carbon atoms and selected from the group consisting of alkyl primary monohydric alcohols and alkyl secondary monohydric alcohols, until said flatting agent remains in a flocculent condition when said composition is allowed to stand, said condensation product being soluble in said composition to the extent of at least 0.05% by weight, said flatting agent being employed in an amount sufficient to reduce the gloss of films prepared from said coating composition.

11. A process of preparing flatted and semi-gloss compositions which comprises grinding a silica gel flatting agent in a drying oil-resin varnish consisting essentially of a drying oil-resin dissolved in an organic solvent in the presence of from 1 to 30%, on the weight of said silica gel flatting agent, of a non-ionic surface active condensation product of 7 to 20 molecular proportions of ethylene oxide and 1 molecular proportion of an aliphatic monohydric alcohol having from 8 to 16 carbon atoms and selected from the group consisting of alkyl primary monohydric alcohols and alkyl secondary monohydric alcohols, until said flatting agent remains in a flocculent condition when said varnish is allowed to stand, said condensation product being soluble in said varnish to the extent of at least 0.05% by weight, said flatting agent being employed in an amount sufficient to reduce the gloss of films prepared from said varnish.

12. A process as in claim 11, but further characterized in that said flatting agent is a silica aerogel.

13. A process of preparing flatted and semi-gloss drying oil-resin varnishes which comprises grinding a mixture of a drying oil-resin varnish consisting essentially of a drying oil-resin dissolved in an organic solvent and containing from 15 to 35% by weight of solids and from 1 to 30%, on the weight of varnish solids in the final composition, of a silica aerogel in the presence of from 1 to 30%, on the weight of said aerogel, of a non-ionic surface active condensation product of 7 to 20 molecular proportions of ethylene oxide and 1 molecular proportion of an aliphatic monohydric alcohol having from 8 to 16 carbon atoms and selected from the group consisting of alkyl primary monohydric alcohols and alkyl secondary monohydric alcohols, and which is soluble in said varnish to the extent of at least 0.05% by weight, said mixture being ground at least until said aerogel is flocculated in said varnish, adding at least one additional increment of a drying oil-resin varnish containing the same ingredients as the initial varnish and grinding said mixture until said aerogel remains in a fluocculent condition when the mixture is allowed to stand, the amount of varnish thus added being sufficient to provide a composition which contains from about 20 to 50% by weight of varnish solids.

14. A process as in claim 13, but further characterized in that said condensation product is the condensation product of 7 to 20 molecular proportions of ethylene oxide and 1 molecular proportion of a branched chain primary alkyl monohydric alcohol having from 8 to 16 carbon atoms in the alkyl group.

15. A process as in claim 14, but further characterized in that said condensation product is a condensation product of 10 to 20 molecular proportions of ethylene oxide and 1 molecular proportion of a mixture of isomeric branched chain primary monohydric tridecyl alcohols boiling in the range of 252 to 272° C. at atmospheric pressure.

16. A process as in claim 13, but further characterized in that said condensation product is the condensation product of 7 to 20 molecular proportions of ethylene oxide and 1 molecular proportion of a branched chain primary alkyl monohydric alcohol having from 10 to 16 carbon atoms.

17. A process as in claim 13, but further characterized in that said condensation product is the condensation product of 1 molecular proportion of an alkyl secondary monohydric alcohol having from 8 to 16 carbon atoms and 7 to 20 molecular proportions of ethylene oxide.

18. A process as in claim 13, but further characterized in that said condensation product is the condensation product of 1 mol of octano-2 and 15 mols of ethylene oxide.

References Cited in the file of this patent

UNITED STATES PATENTS

| | | |
|---|---|---|
| 2,125,951 | Parry | Aug. 8, 1938 |
| 2,396,051 | Laus | Mar. 5, 1946 |
| 2,417,344 | Barrett | Mar. 11, 1947 |
| 2,418,452 | Auer | Apr. 8, 1947 |
| 2,418,453 | Auer | Apr. 8, 1947 |
| 2,481,693 | Schosser et al. | Sept. 13, 1949 |

OTHER REFERENCES

White et al.: Jour. Ind. & Eng. Chem. 33, pp. 1169–1173 (1941).

Zimmerman et al.: "Handbook of Material Trade Names" (1953), page 209.